United States Patent [19]

Tomita

[11] Patent Number: 5,398,138
[45] Date of Patent: Mar. 14, 1995

[54] VIDEO TAPE FOR RECORDING AND REPRODUCING PLURAL DIFFERENT INDEPENDENT VIDEO SIGNALS SIMULTANEOUSLY

[75] Inventor: Masao Tomita, Shijonawate, Japan

[73] Assignee: Matsushita Electric Industrial Co., Ltd., Osaka, Japan

[21] Appl. No.: 175,677

[22] Filed: Dec. 30, 1993

Related U.S. Application Data

[63] Continuation of Ser. No. 818,899, Jan. 10, 1992, abandoned.

[30] Foreign Application Priority Data

Jan. 16, 1991 [JP] Japan ................. 3-003193
Jun. 24, 1991 [JP] Japan ................. 3-151387
Nov. 6, 1991 [JP] Japan ................. 3-289668

[51] Int. Cl.⁶ .............................................. G11B 5/02
[52] U.S. Cl. ..................................... 360/22; 360/27;
 360/33.1; 360/64; 358/335
[58] Field of Search ................. 360/70, 10.1, 10.2,
 360/10.3, 22, 26, 27, 55, 61, 64, 33.1; 358/14,
 15, 22, 341, 335, 142, 143, 144

[56] References Cited

U.S. PATENT DOCUMENTS

| | | | |
|---|---|---|---|
| 4,438,465 | 3/1984 | Moriya et al. | 360/22 |
| 4,772,961 | 9/1988 | Ichinoi | 360/33.1 X |
| 4,897,739 | 1/1990 | Hasegawa et al. | 360/33.1 |
| 4,901,159 | 2/1990 | Hitotsumachi | 360/33.1 X |
| 5,010,424 | 4/1991 | Hasegawa et al. | 360/18 |
| 5,050,010 | 9/1991 | Park | 360/33.1 |
| 5,050,010 | 9/1991 | Park | 360/33.1 |

FOREIGN PATENT DOCUMENTS

| | | |
|---|---|---|
| 0148378 | 11/1984 | European Pat. Off. . |
| 59-117383 | 7/1984 | Japan . |
| 63-280589 | 11/1988 | Japan . |

OTHER PUBLICATIONS

Patent Abstracts of Japan, vol. 13, No. 109 (E-727) (3457), Mar. 15, 1989 & JP-A-63 280,589 (Hitachi), Nov. 17, 1988.
Patent Abstracts of Japan, vol. 12, No. 162 (E-609), May 17, 1988 & JP-A-62 272 695 (Hitachi), Nov. 26, 1987.
Patents Abstracts of Japan, vol. 13, No. 109 (E-727) (3457), Mar. 15, 1989 & JP-A-63 280,589 (Hitachi), Nov. 17, 1988, Okada et al.
Patent Abstracts of Japan, vol. 12, No. 162 (E-609), May 17, 1988 & JP-A-62 272 695 (Hitachi), Nov. 26, 1987, Fumihiko et al.

Primary Examiner—Andrew L. Sniezek
Attorney, Agent, or Firm—Stevens, Davis, Miller & Mosher

[57] ABSTRACT

A video tape recorder in which video and audio signals of a plurality of channels are simultaneously recorded onto the same tape by using the same tape running mechanism and the signals of a plurality of channels may be simultaneously reproduced from the tape. The video tape recorder of the invention comprises a recording system and a playback system. The recording system includes a recording processing unit for converting the plurality of video signals into recordable signals, respectively; first and second rotary head pairs which are oppositely arranged with respect to a cylinder. Each head has a track width narrower than a recording track pitch and have gap azimuth angles in an opposite relation. Each head records the signals onto the tape and reads out the signals from the tape. The recording system further includes a unit for recording a control signal synchronous with a vertical sync signal included in one video signal onto a control track. The playback system includes a playback processing unit for reconstructing reproduced signals from the rotary head pairs into video signals and a servo unit for reproducing the control signal to control the rotary head pair and the tape run.

13 Claims, 8 Drawing Sheets

VIDEO TAPE FOR RECORDING AND REPRODUCING PLURAL DIFFERENT INDEPENDENT VIDEO SIGNALS SIMULTANEOUSLY

This application is a continuation of U.S. patent application Ser. No. 07/818,899, filed Jan. 10, 1992, (abandoned).

BACKGROUND OF THE INVENTION

1. Field of the Invention

The invention relates to a video tape recorder (VTR) for recording and reproducing video signals and audio signals and, more particularly, to a video tape recorder which can simultaneously record a plurality of video signals and audio signals onto the same tape by a single tape running mechanism and can also reproduce a desired signal.

2. Description of the Related Art

In recent years, the widespread proliferation of home-use VTRs is remarkable. However, when video images of a television broadcasting are recorded, it is impossible to simultaneously record video signals of a plurality of channels by one VTR. Such a drawback is felt to be further inconvenient due to the recent developments of the satellite broadcasting BS and the cable television CATV.

As a conventional method of recording a plurality of video signals by one VTR, there is a method called a field skip. For instance, a prior art technique is taught in JP-A-59-117383. FIG. 1 shows a prior art construction of a video tape recorder. Video signals given to input terminals 21 and 22 are synchronized by a delay circuit 25 and a control circuit 26. A synthesis signal in which the respective input signals are alternately rearranged by every field by a select circuit 24 is obtained and is recorded by a rotary head 30 through a recording circuit 29. In the reproducing operation, the synthesis signal reproduced by a playback circuit 31 is delayed to form a delayed signal by a delay circuit 32. Each of the video signals is obtained from the synthesis signal and the delayed signal selected by a select circuit 33. However, in such a field skip recording, since each of the video signals is recorded every other field, the video information is intermittently reproduced and there is a drawback such that the reproduced image becomes unnatural. Even in the case of a line skip method in which the input signals are rearranged every line, there is a problem such that a vertical resolution of the reproduced image deteriorates.

As a method of recording all information instead of the field skip, there is a method of recording a plurality of video signals by using a plurality of head pairs as disclosed in JP-A-63-280589. FIG. 2 shows a tape pattern based on the above method. A signal of the R channel is recorded by the pair of rotary heads having azimuth angles of $\pm\theta$ and a signal of the L channel is recorded by the pair of rotary heads having different azimuth angles $\pm\theta$. In the above case, although the recording and reproduction can be performed by a customer, when the signal on the tape recorded by such a VTR is reproduced by the conventional VTR, the signal of only one selected channel can be reproduced and there is a large problem in terms of the compatibility.

The conventional technique as mentioned above is insufficient to record and reproduce a plurality of video signals and audio signals and is not put-into practical use as a home-use VTR.

SUMMARY OF THE INVENTION

It is an object of the invention to provide a VTR which makes it possible to perform a function which cannot be realized by the conventional VTR. That is, the function such that video signals of a plurality of channels are recorded and reproduced by one VTR and a desired video signal recorded on a tape by the VTR according to the invention can also be reproduced by a conventional home-use VTR, thereby maintaining compatibility with the wide spread of home-use VTRs and corresponding to an increasing variation of input sources.

To accomplish the above subject, according to a video tape recorder of the invention, a recording system is constructed by including a plurality of recording processing means for converting a plurality of video signals into recordable signals, a pair of first rotary heads each of which has a track width narrower than a recording track pitch and in which there is an opposite relation between gap azimuth angles and there is an angle difference of 180° between the relative positions, a second pair of rotary head which have the same azimuth angle relation as that of the first rotary head pair and are arranged at relative positions of 180°, and means for recording a control signal synchronized with a vertical sync signal of either one of a plurality of video signals to a control track, and a reproducing system is constructed by including playback reproducing means for reconstructing reproduction signals obtained by the plurality of rotary head pairs into the original video signals and servo means for reproducing the control signal recorded on the control track and for controlling the rotary head pairs and the tape run.

With the above construction-of the invention, a plurality of videosignals are simultaneously recorded by a plurality of rotary head pairs on a plurality of tracks formed by dividing the track pitch of the conventional VTR, and in the above case, the azimuth angles of the plurality of rotary head pairs are set to the same values as those of the conventional industrial VTRs, and the information synchronized with the vertical sync signal of either one of the video signals is recorded on the control track. Therefore, the plurality of video signals recorded can be simultaneously reproduced or selectively reproduced. Moreover, even when the tape recorded on the basis of the method of the invention is loaded into the conventional VTR, a plurality of video signals can be selectively reproduced.

Accordingly, it is the first object of the invention to enable a plurality of video and audio signals to be simultaneously recorded onto the same tape by a single mechanism.

The second object of the invention is to realize a video tape recorder which can simultaneously record video and audio signals of two channels while keeping a complete compatibility with the wide spread of conventional home-use video tape recorders of the azimuth recording type.

The third object of the invention is to provide a recording method in which a conventional home-use VTR can reproduce video and audio signals of a respective channel independently from the tape on which the video and audio signals of two channels have simultaneously been recorded.

The fourth object of the invention is to provide a video tape recorder which can selectively or simultaneously reproduce video and audio signals of two channels which have simultaneously been recorded.

DESCRIPTION OF THE PREFERRED EMBODIMENTS

Figure 3:
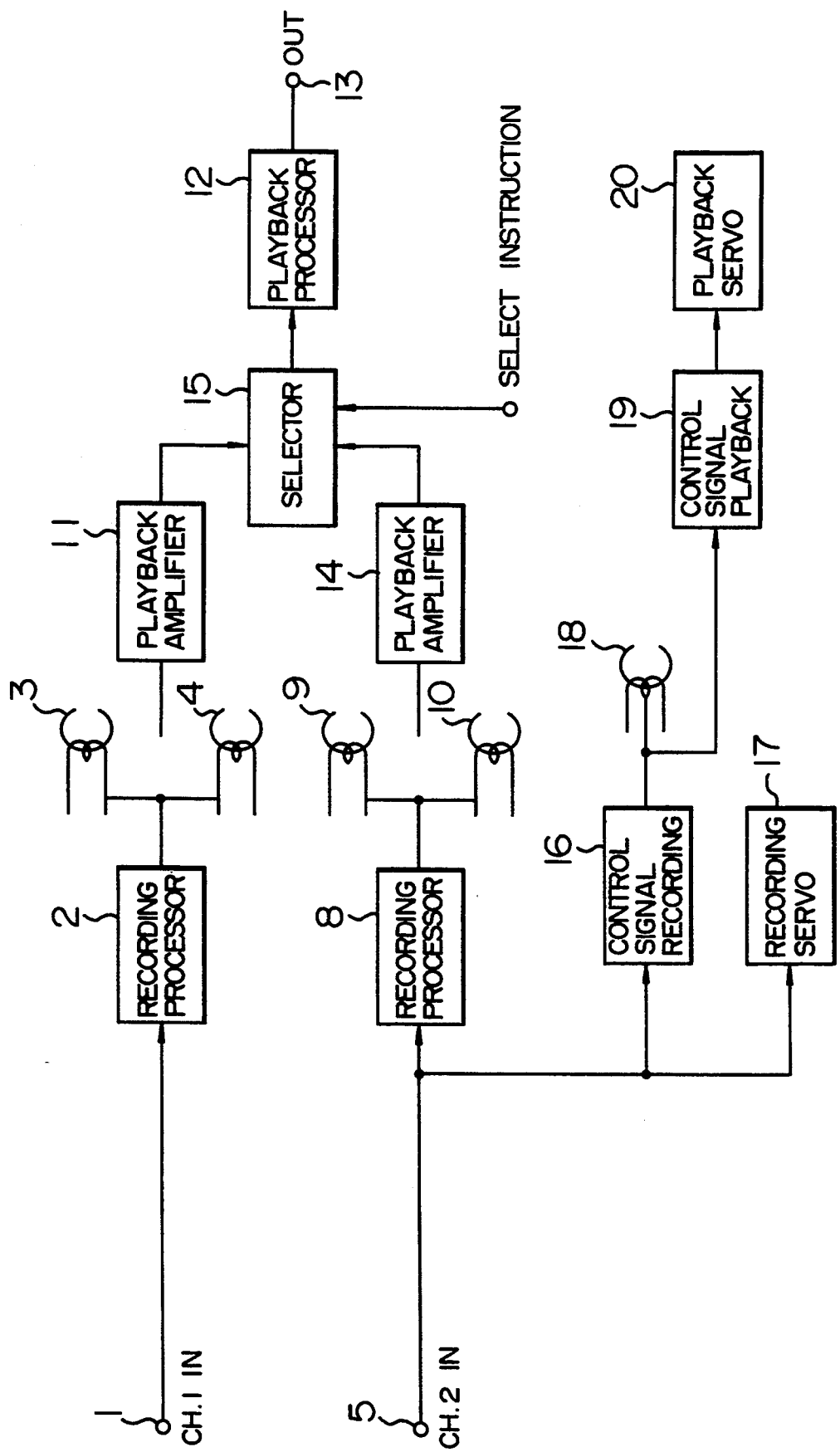
FIG. 3 is a block diagram showing a basic configuration of a recording and reproducing apparatus of the invention illustrating a circuit to record video signals of two channels simultaneously and a circuit to selectively reproduce the video signals of two channels used in a video tape recorder.

Embodiments of the invention will be described hereinbelow with reference to the drawings. FIG. 3 is a block diagram showing a fundamental construction of the invention. Reference numeral 1 denotes an input terminal of the channel 1; 2 a recording processor; 3 and 4 a first pair of rotary heads; 5 an input terminal of the channel 2; 8 a recording processor; 9 and 10 a second pair of rotary heads; 16 a control signal recording circuit; 17 a recording servo system; and 18 a control signal recording/playback head. The above component elements comprise a recording system. A playback system is composed of a playback amplifier 11 to select and amplify the signals from the pair of rotary heads 3 and 4, a playback amplifier 14 to select and amplify the signals of the pair of rotary heads 9 and 10, a selector 15 for switching outputs of the playback amplifiers 11 and 14, a playback processor 12, a video output terminal 13, a control signal playback amplifier 19, and a playback servo system 20.

The relations and operations of the component elements of the VTR having the above configuration will now be described. It is now assumed that there are video signals of two channels given to the input terminals 1 and 5, respectively. The video signal of the first channel supplied to the input terminal 1 is subjected to necessary processes for recording by the recording processor 2. The above processes are substantially the same as the recording processes in the conventional home-use VTR. A luminance signal is subjected to processes such as emphasis, frequency modulation, and the like. Chrominance signals are converted into low frequency signals. The signal of the channel 1 transmitted through the recording processor 2 is supplied to the rotary heads 3 and 4 whose azimuth angles are set to $+\theta$ and $-\theta$ respectively and whose track widths are narrower than a track pitch, so that the signal is recorded onto the tape in a manner similar to the conventional VTR. On the other hand, the signal of the channel 2 is subjected to processes necessary for recording by the recording processor 8. The above processes are substantially the same as those of the recording processor 2. The signal of the channel 2 transmitted through the recording processor 8 is supplied to be recorded to the rotary heads 9 and 10 whose azimuth angles are set to $+\theta$ and $-\theta$ respectively and whose track widths are narrower than the track pitch. In the case of recording the video signals by the VTR, it is necessary to record a control signal synchronized with the video signal to a control track on the tape. In the case of this embodiment, the control signal synchronized with the video signal of the channel 2 is recorded to the control track on the tape by the control signal recording circuit 16 and the fixed control head 18. The control signal is used as a control signal for a playback servo system to control a cylinder and a capstan in the reproducing operation. The control signal bears information to synchronize with a vertical sync signal of the input video signal and functions so as to control such that a switching timing of the rotary head pair 9 and 10 is located in a vertical blanking period of the video signal, thereby preventing a fluctuation of a display picture on the screen due to the selecting section of the heads. In the embodiment, the video signal of the channel 2 keeps the above relation. However, since the video signal of the channel 1 is ordinarily not synchronized with the video signal of the channel 2, the vertical sync signal of the channel 1 is not synchronized with the control signal which is recorded by the control head 18. Therefore, the switching between the rotary heads 3 and 4 may be performed outside of the vertical blanking portion, so that a connecting portion of the images due to the switching of the heads appears in the reproduced picture plane. However, according to the recent VTR technique, the connecting accuracy of the head switching portion is improved so as to obtain an almost allowable picture quality, so that a sufficiently acceptable picture quality for practical use may be obtained for the video signal of the channel 1. The control signal can be obviously derived also from the signal of the channel 1. In such a case, the video signal of the channel 1 is completely reproduced without any connecting portion and the video signal of the channel 2 is reproduced while a small connecting portion remains on the screen.

Consideration is made so as not to overlap the tracks on the tape which are recorded by the heads 3, 4, 9, and 10. A method of realizing such a construction will be explained hereinafter.

In the reproducing system, the signals of channel 1 which are reproduced by the heads 3 and 4 are amplified selectively by the playback amplifier 11, so that a continuous signal is generated. Similarly, the signals of channel 2 which are reproduced by the heads 9 and 10 are transmitted through the playback amplifier 14 and transferred to the selector 15. The selector 15 selects either one of the signals of channels 1 and 2 in accordance with a command of the user. Either selected one of the signals is subjected to reproducing processes (deemphasis, frequency demodulation, color frequency conversion, etc.) similar to those in the conventional VTR by the playback processor 12 and is provided as a playback video signal to the output terminal 13. According to the embodiment of FIG. 3 as mentioned above, the video signals of two channels can be simultaneously recorded by one VTR, and in the reproducing operation, the signal of either one of the two channels can be selected and reproduced.

The recording tracks on the tape by the rotary heads 3, 4, 9, and 10 will now be described.

Figure 4:
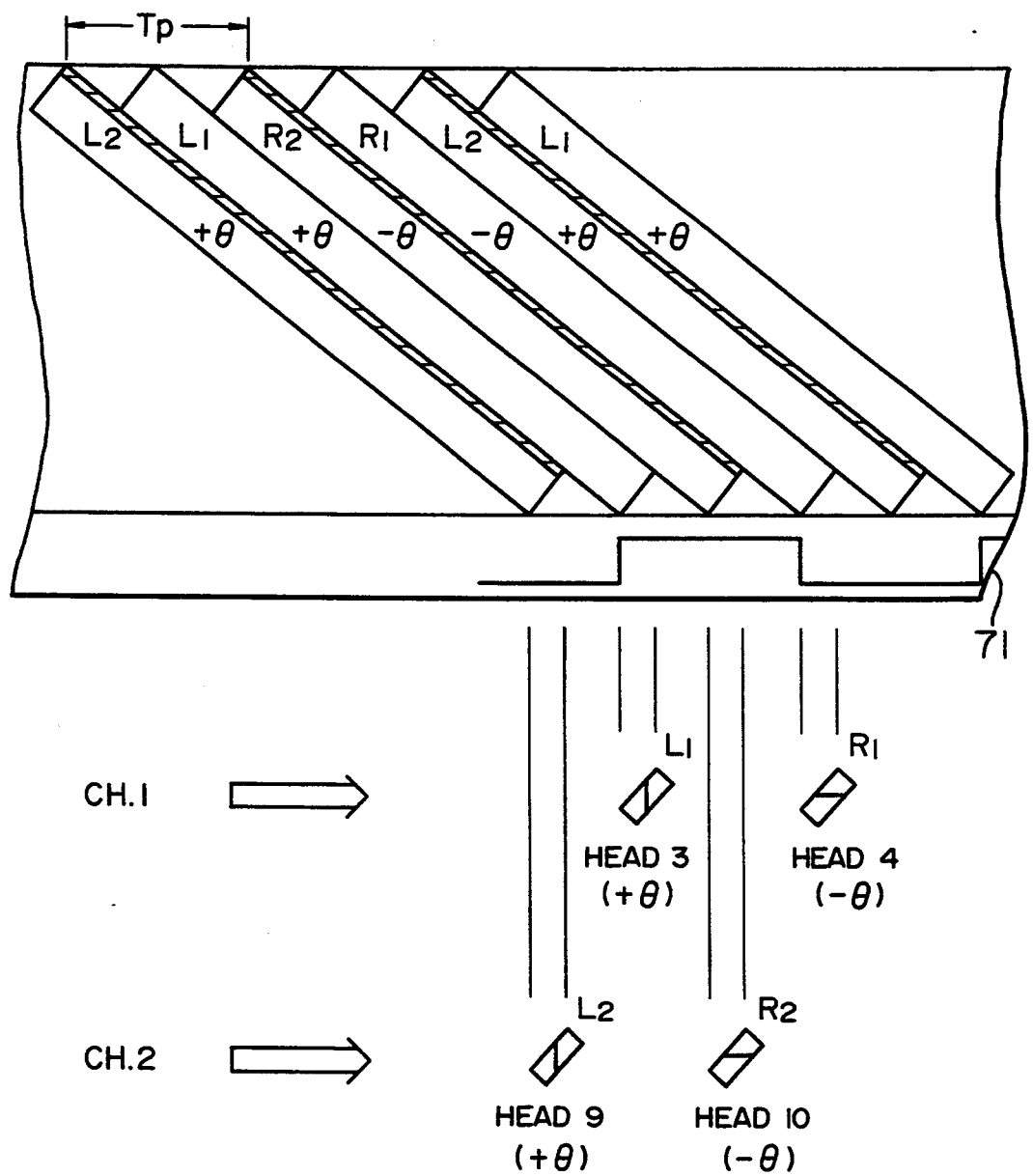
FIG. 4 is a relational diagram between tape recording patterns and azimuth angles of recording and reproducing heads showing the fundamental principle of the invention.

In the embodiment of FIG. 3, the video signals of two channels are recorded. In this case, the servo system of the VTR is set into the standard mode. For instance, in a VHS-VTR, the track pitch in the standard mode is equal to 58 $\mu$m and the tape feed speed is set at 3.3 cm/sec as a standard mode of the conventional VTR. A track width of each rotary head 3, 4, 9, or 10 is narrower than the track pitch and is set to about 25 $\mu$m which is equal to or less than $\frac{1}{2}$ of the ordinary track pitch. As already mentioned above, the azimuth angles are set to $\pm \theta$ which are the same as those in the conventional VTR. By setting attaching angles and attaching level differences of the rotary heads on the cylinder, track patterns as shown in FIG. 4 can be formed. In FIG. 4, $T_p$ denotes a track pitch in the standard mode. The video signals of channels 1 and 2 are recorded in tracks $L_1$ and $R_2$ within one track pitch by the heads 3 and 10 so as to have a track width of about $\frac{1}{2}$ and azimuth angles of $+\theta$ and $-\theta$ respectively. Subsequently, the video signals of channels 1 and 2 are recorded in tracks $R_1$ and $L_2$ by the heads 4 and 9 so as to have azimuth angles $-\theta$ and $+\theta$, respectively. Respective head numbers are written in the figure under the corresponding tracks so as to easily understand the relationship between the track patterns and the recording/playback heads. In the above case, the heads 3 and 4 are mounted on the cylinder at opposite positions which are spaced away from each other by an angle of 180°. The heads 9 and 10 are also likewise mounted on the cylinder at the opposite positions which are spaced away from each other by 180°.

As for the tape recorded by such track patterns, in the reproducing operation, with the servo system set at the standard mode, the signals of the channel 1 are sequentially reproduced from the signals of the $L_1$ and $R_1$ tracks by the rotary heads 3 and 4, and the signals of the channel 2 from the signals of the $L_2$ and $R_2$ tracks by the rotary heads 9 and 10. Therefore, by selecting the reproduced signals of either one of the rotary head pairs, the signal of the first or second channel can be obtained. The foregoing control signal is recorded to another control track 71 different from the video tracks in a manner similar to the case of the conventional VTR.

Figure 5:
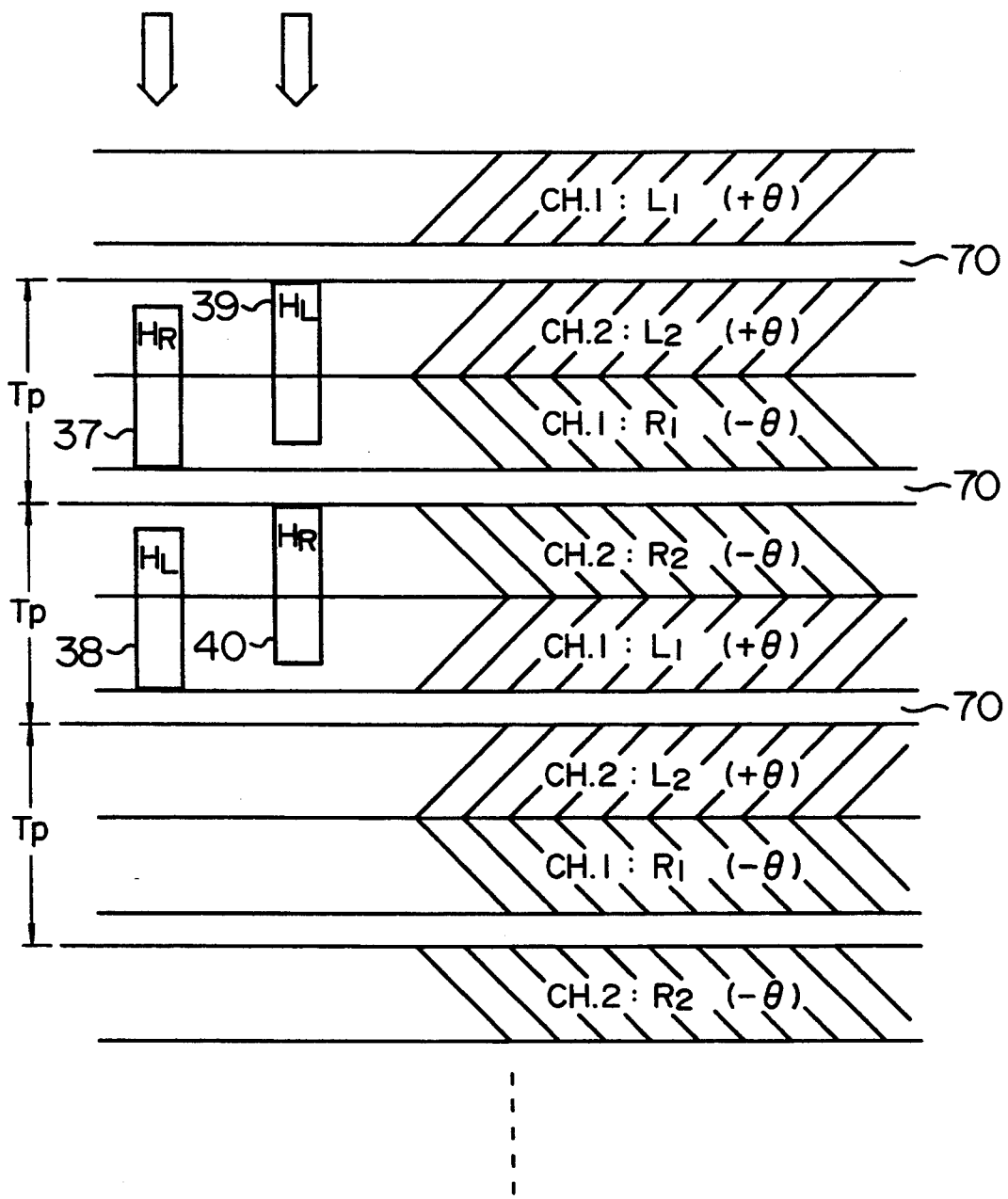
FIG. 5 is a diagram showing the details of tape recording patterns based on the invention and a positional relation of heads in the case of reproducing by the conventional video tape recorder.

FIG. 5 shows the track patterns shown in FIG. 4 in more detail and shows a situation of reproduction by the conventional VTR. Two video signals of $CH_1$ and $CH_2$ are recorded by a head width (about 25 $\mu$m) smaller than $\frac{1}{2}$ of the track pitch (58 $\mu$m) on the tracks with the standard track pitch. Those video signals are recorded in the same azimuth angle relation. The tracks $L_1$ and $R_1$ of the channel $CH_1$ and the tracks $L_2$ and $R_2$ of the channel $CH_2$ have guard bands 70 each having a width of 8 $\mu$m in the above case, thereby preventing the generation of a crosstalk between the same azimuth angles. In the case where the same apparatus reproduces the tape recorded as mentioned above, the signals of two channels can be easily reproduced, since the recording heads and the playback heads are the same.

A situation in the case where a conventional VTR reproduces the tape having the track patterns recorded as mentioned above will now be described. In the conventional VTR, a head width of the standard mode is generally set between 45 and 50 $\mu$m and is wider than $\frac{1}{2}$ of the track pitch $T_p$ and narrower than $T_p$. The position of the heads relating to the track pitch can be shifted by adjusting a tracking shifter for playback operation. In the $CH_1$ playback Operation shown in FIG. 5, the heads each having a width of 49 $\mu$m are shifted to a suitable position for tracking the signal tracks $R_1$ and $L_1$ of the $CH_1$. For example, the head 37 with the azimuth angle of $-\theta$ picks up the signal of the $R_1$ track but does not pick up the signal of the $L_2$ track whose azimuth angle is $+\theta$ because of the azimuth loss. Thus, the signal of the $R_1$ track of $CH_1$ can be reproduced by the head 37. The head 38, the other one of the pair, with the azimuth angle of $+\theta$ reproduces the $L_1$ track but does not pick up the signal on the $R_2$ track. Thus, the signal of the $L_1$ track of $CH_1$ is reproduced by the head 38. As mentioned above, since the playback heads are shifted to the playback position for the $CH_1$ by the tracking shifter, the signals of the $CH_1$ can be selectively reproduced, even though the heads are wider than the recorded track. On the contrary, when the pair of rotary heads are moved to the playback position for the $CH_2$ by the tracking shifter, the head 39 reproduces the $L_2$ track and the head 40 reproduces the $R_2$ track, while the signals of the adjacent other tracks $L_1$ and $R_1$ are not picked up. Thus, the signal of the $CH_2$ can be reproduced. When the recording tape patterns are set as in the embodiment mentioned above, the video signals of two channels can be selected and reproduced also by the conventional VTR. Thus, compatibility with the conventional VTR can be assured.

In the embodiment, it is also possible to easily construct one of two pairs of rotary heads to be commonly used for the conventional type of a long recording time mode. In the case of the VHS-VTR, the track width of the heads for the long time mode is set within a range from 20 to 30 $\mu$m and meets the above conditions. With the above construction, it is sufficient to modify the VTR to a 2-channel recording type by adding only a pair of rotary heads and it is economical.

Figure 6:
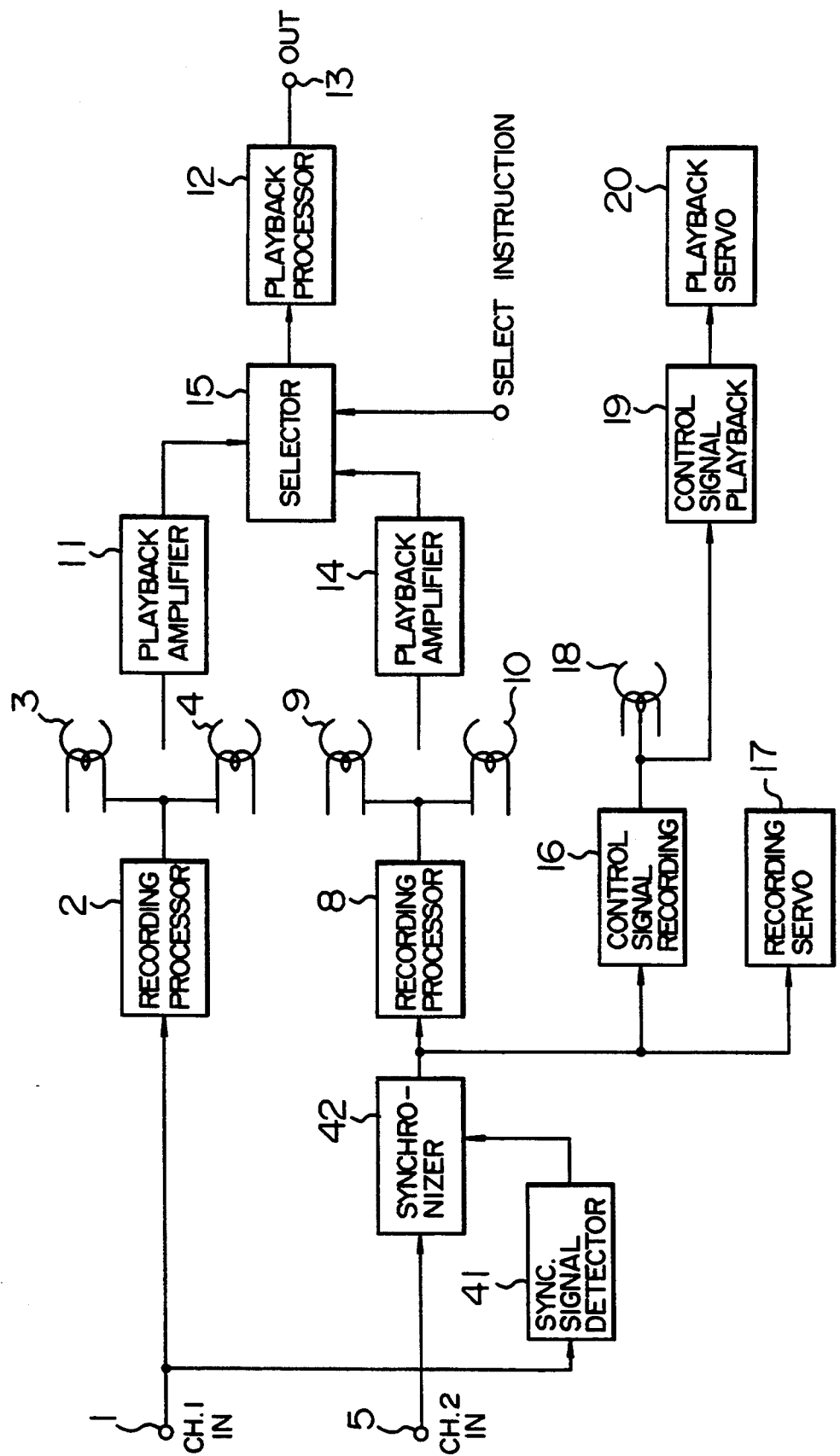
FIG. 6 is a block diagram showing a configuration of another recording and reproducing apparatus of the invention which can obtain a further improved picture quality.

FIG. 6 is a block diagram showing another embodiment of the invention. In this embodiment, a further improved picture quality can be provided in a method of simultaneously recording video signals of two channels onto one tape. In the first embodiment shown in FIG. 3, when two input video signals are not synchronized, the head switching operation of one channel is possibly executed within an effective picture plane out of the blanking period, so that a scratch noise due to the head switching appears on the picture plane of the reproduced signal. The embodiment of FIG. 6 shows a configuration of a 2-channel recording and reproducing method in which the above drawback is eliminated. In FIG. 6, the component elements having the same functions as those in the embodiment of FIG. 3 are designated by the same reference numerals.

Reference numeral 1 denotes the input signal terminal of the channel 1; 2 the recording processor; 3 and 4 the rotary head pair; 5 the input signal terminal of the channel 2; 41 a sync signal detector; 42 a synchronizer; 8 the recording processor; and 9 and 10 the pair of rotary heads. The above component elements construct the recording system together with the control signal recording circuit 16, recording servo system 17, and control signal recording/playback head 18. The playback system is constructed by the playback amplifier 11 for selectively amplifying the signals of the rotary head pair 3 and 4, the playback amplifier 14 for selectively amplifying the signals of the rotary head pair 9 and 10, the selector 15 for selecting the outputs of the playback amplifiers 11 and 14, playback processor 12, the output terminal 13, the control signal playback amplifier 19, and the playback servo system 20 in a manner similar to FIG. 3.

The relations and operations of the component elements of the VTR in the above construction will now be described. It is now assumed that video signals of two channels are given to the input terminals 1 and 5, respectively. The video signal of the first channel supplied to the input terminal 1 is subjected to processes which are necessary for recording by the recording processor 2. The above processes are substantially the same as the recording processes of the conventional home-use VTR. The luminance signal is subjected to processes such as emphasis, frequency modulation, and the like. The chrominance signals are converted into low frequency signals. The signal of channel 1 transmitted through the recording processor 2 is supplied to the rotary heads 3 and 4 in which azimuth angles are set to $+\theta$ and $-\theta$ and each track width is narrower than the track pitch. The signal of the channel 1 is recorded onto the tape by the rotary heads 3 and 4 in a manner similar to the conventional VTR. On the other hand, the signal of channel 2 is controlled so as to keep synchronizing relation with the video signal of the channel 1 by the synchronizer. In operation, for instance, the video signal is written into a memory having a capacity of one frame by a write clock which is synchronized with the sync signal included in the video signal. The sync signal is detected from the signal of the channel 1 by the sync signal detector 41. The video signal is read out from the memory by a read clock which is synchronized with the sync signal. Thus, an output signal synchronized with the video signal of the channel 1 is derived. The signal of the channel 2 synchronized with the signal of the channel 1 derived as mentioned above is subjected to the necessary processes for recording by the recording processor 8. The above processes are substantially the same as those of the recording processor 2. The signal of the channel 2 transmitted through the recording processor 8 is supplied to the rotary heads 9 and 10 in which azimuth angles are set to $+\theta$ and $-\theta$ and each track width is narrower than the track pitch. The signal of channel 2 is recorded by the rotary heads 9 and 10. In the case of recording the video signals by the VTR, it is necessary to record the control signal synchronized with the video signal onto the control track on the tape. In such a case, since only one control signal can be recorded when two video signals are recorded, both of the video signals are synchronized with the common control signal recorded as mentioned above.

Thus, the input video signal of channel 2 is synchronized with the input video signal of the channel 1, since the signal of the channel 2 also has a synchronizing relation with the same control signal which is recorded onto the control track. Therefore, the head switching position can be located in the vertical blanking period and it is possible to perform the recording and playback in which a scratch noise due to the head switching does not appear in the effective picture plane.

The above conditions relate to the case where the rotary head pair 3 and 4 and the rotary head pair 9 and 10 are arranged at the same positions on the rotary cylinder. When the position of the rotary head pair 3 and 4 is away from the position of the rotary head pair 9 and 10 on the cylinder, it is sufficient to shift the vertical sync signal picked up by the other rotary head pair in accordance with the distance between both of those positions. Such a shifting operation can be easily realized by starting the reading operation of the synchronizer 42 by a signal which is delayed by a predetermined time from the vertical sync signal of the video signal of the $CH_1$.

As for the playback system, the operation is executed in substantially the same manner as that in the case of the embodiment of FIG. 3. The video signals of two channels recorded can be selected and reproduced on the basis of a command of the user.

Figure 7:
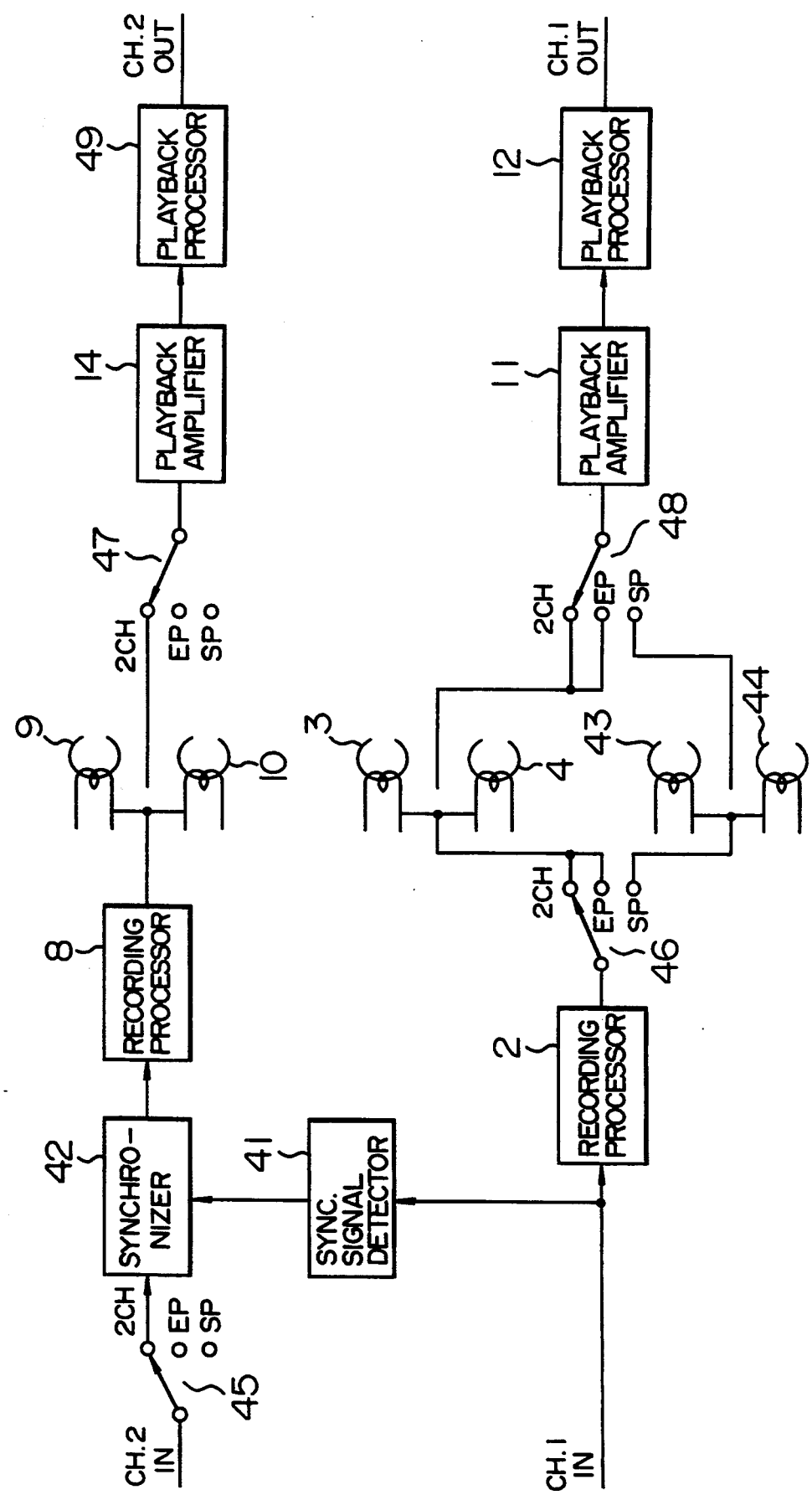
FIG. 7 is a block diagram showing a configuration of a further recording and reproducing apparatus of the invention applied to a video tape recorder enabling signals of two channels to be simultaneously reproduced and having a complete compatibility with the conventional home-use VTR.

FIG. 7 shows another VTR according to the invention including a 2-channel recording and reproducing function. The VTR is constructed so as to realize more perfect compatibility with conventional wide spread home-use VTRs. FIG. 7 differs from FIG. 6 with respect to a point that change-over switches 45, 46, 47, and 48 are provided and complete compatibility is maintained by having the standard recording/playback mode (SP) and the long time recording/playback mode (EP) as the conventional VTR has, in addition to the 2-channel recording mode. FIG. 7 also differs from FIG. 6 with regard to a point that the outputs of the playback amplifiers 11 and 14 are provided to the playback processors 12 and 49 to be respectively playback processed and the video signals of the two channels 1 and 2 are simultaneously generated. Although two playback processors are needed for the latter feature, this VTR realizes various characteristic functions such that different reproduction signals are supplied to different television monitors respectively, and that the signal of the other channel is displayed in a small picture plane in one screen, and the like.

Figure 1:
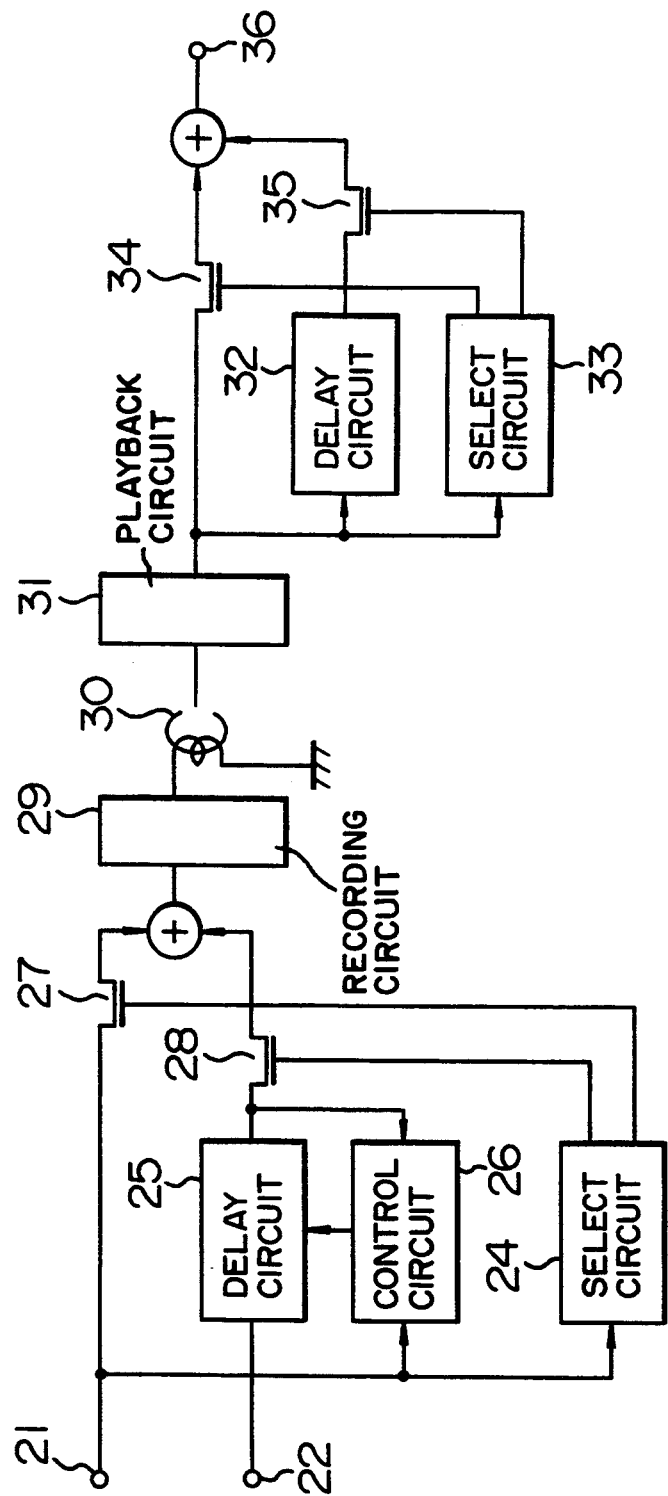
FIG. 1 is a block diagram of a conventional recording and reproducing apparatus recording video signals of two channels by one video tape recorder.
Figure 2:
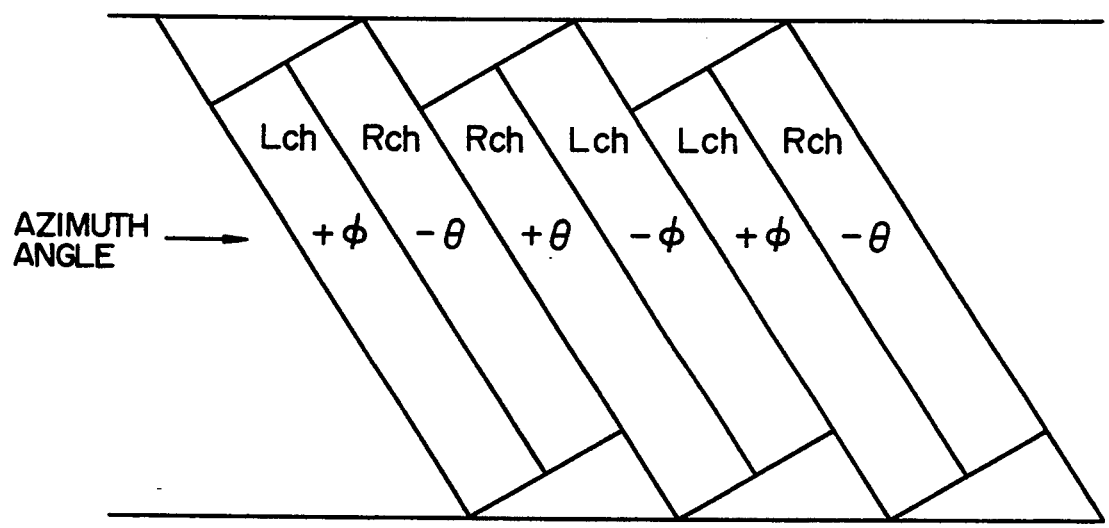
FIG. 2 is a diagram showing a tape format in a conventional recording and reproducing apparatus recording a plurality of video signals to a plurality of video tracks.

In the embodiment of FIG. 7, when the switches 45 and 46 are connected to the 2CH side, the input signal of the $CH_1$ is transmitted through the recording processor 2 and is recorded by the heads 3 and 4. The input signal of the $CH_2$ is transmitted through the synchronizer 42 and recording processor 8 and is recorded by the heads 9 and 10. As described above referring to FIG. 2, those input signals are simultaneously recorded onto the tape in a form on divided halves of the track pitch of the standard mode. Therefore, as already mentioned above, the heads 9 and 10 and the heads 13 and 14 preferably have a track width of about 25 $\mu$m. When the switches 45 and 46 are connected to the EP side, the VTR is set into the long time mode, and the input video signal of the $CH_1$ only is supplied to the heads 3 and 4 through the recording processor 2 and is recorded at a track pitch in the EP mode. The rotary heads 3 and 4 are commonly used in both of the 2-channel recording/playback mode and the long time recording/playback mode. The track width of about 25 $\mu$m satisfies the above conditions. When the switches 45 and 46 are connected to the SP side, the input video signal of the $CH_1$ is supplied to heads 43 and 44 through the recording processor 2 and is recorded onto the tape at a track pitch in the standard mode. The heads 43 and 44 have a track width of 45 to 50 μm. In the EP and SP modes, the input video signal of the $CH_2$ is not supplied to any of the heads. In a playback operation, either one of the 2CH, EP and SP playback mode is selected by the switches 47 and 48. It is preferable that those switches are automatically switched on the basis of the information of a control signal and video signals on the recorded tape. In the embodiment as mentioned above, since the VTR has substantially the same standard and long time recording/playback modes as those in the conventional VTR, the VTR of the invention executes playback of the tape recorded by the conventional VTR and the conventional VTR can playback the tape recorded in the SP or EP mode of the VTR of the invention without any trouble. Thus, compatibility can be maintained. Further, simultaneous recording and playback of the signals of two channels which is impossible in the conventional VTR can be executed by the VTR of the invention because the VTR has two-channel recording mode. Moreover, the tape recorded in such a mode can be also reproduced by the conventional VTR. Consequently, an extremely convenient VTR is realized.

According to the video tape recorder of the embodiment of the invention as mentioned above, since the signal of the second channel is recorded between the recording tracks of the first channel, the signals of a plurality of channels are recorded on the same tape, those signals can be selectively or simultaneously reproduced, and the control signal synchronized with either one of both of the above signals is recorded. Therefore, even in another VTR, the signal of each channel on the recording tape can be selectively reproduced. When one VTR has the standard mode, long time mode, and a plurality of channel recording mode, the more complete compatibility is accomplished.

Figure 8:
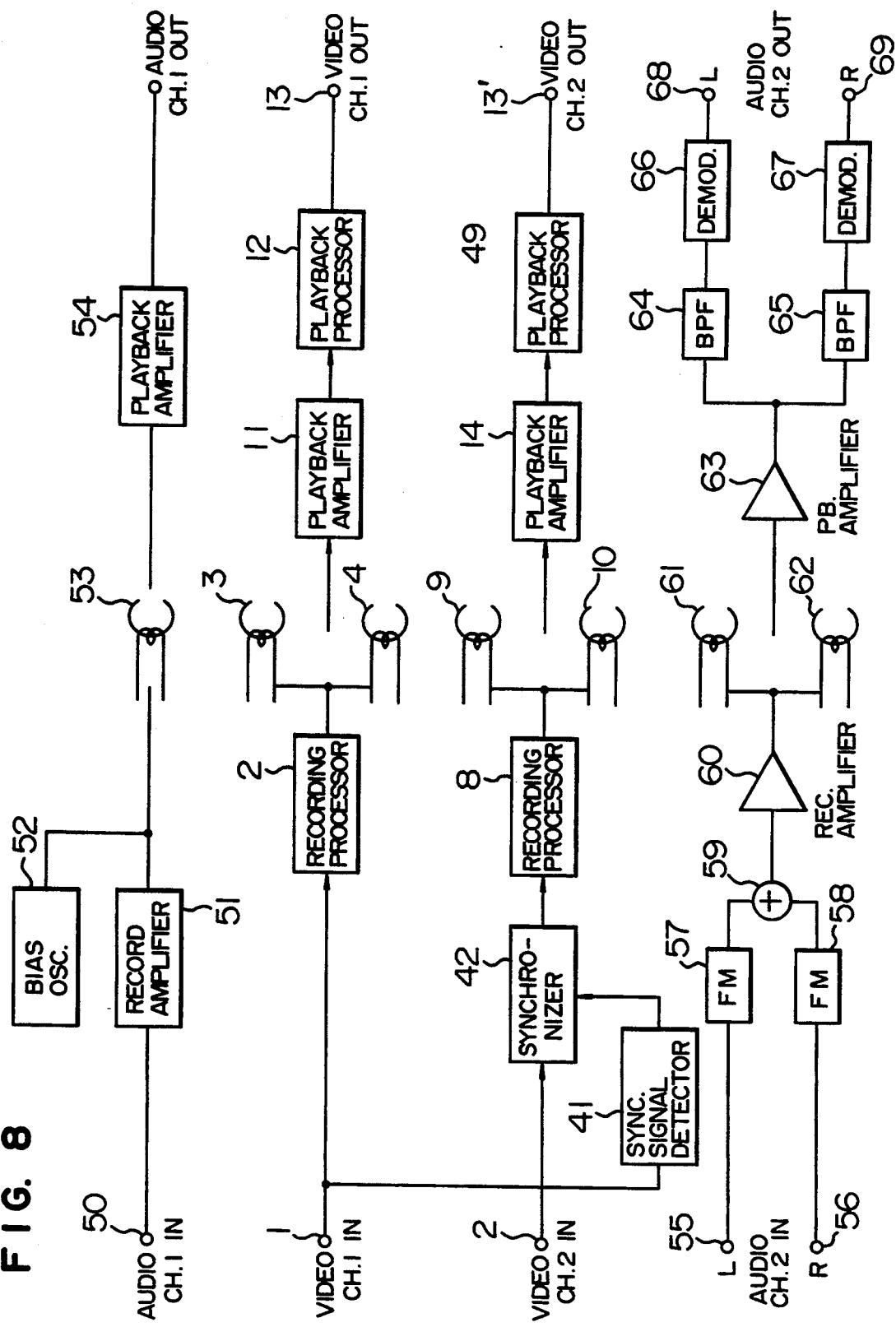
FIG. 8 is a block diagram of a still another recording and reproducing apparatus of the invention recording and reproducing not only video signals of two channels but also an audio signal added to each video signal.

FIG. 8 shows a still another apparatus of the invention and is a block diagram showing a method for recording video signals of two channels simultaneously and recording audio signals of two channels simultaneously in correspondence to the video signals. In FIG. 8, the component elements having the same functions as those described above are designated by the same reference numerals. The control signal system is omitted since its operation is substantially the same as that mentioned above.

The input video signal of the $CH_1$ is transmitted through the recording processor 2 and is recorded by the rotary head pair 3 and 4, while the input video signal of $CH_2$ is synchronized with the signal of $CH_1$ by the synchronizer 42 and, thereafter, it is transmitted through the recording processor 8 and is recorded by the rotary head pair 9 and 10 in a manner similar to the case which has been described above.

The input audio signal of $CH_1$ which is given to the terminal 50 and corresponds to the input video signal of the $CH_1$ is amplified by the recording amplifier 51. A high frequency bias is applied from the bias oscillator 52. After that, the resultant audio signal is recorded onto an audio track on the magnetic tape by the fixed audio head 53. Since the audio track is recorded into a region on the tape which is different from both of the video signal tracks and the control signal track, no interference with the video signals and control signal occurs. In the playback operation, the audio signal of $CH_1$ recorded on the audio track is reproduced by the playback amplifier 54.

Although the audio signal has been described as monaural here, stereophonic audio signals can also be easily treated by dividing the audio track into halves and by using two audio heads.

The input audio signals which are given to the input terminals 55 and 56 and correspond to the input video signal of the $CH_2$ are frequency modulated by the frequency modulators (FM) 57 and 58 by different carrier frequencies respectively. Both of the FM waves are mixed by the mixer 59, thereafter. The mixed signal is amplified by the recording amplifier 60 and supplied to the rotary head pair 61 and 62. On the magnetic tape, although the rotary head pair 61 and 62 commonly use the same region for the video track portion, the mixed signal is recorded into a deeper layer portion of the magnetic tape by a different azimuth angle from the video signals. Thus, the mixed signal can be recorded without any interference with the video signals. Such a technique has already been used in conventional home-use video cassette recorders VCR.

In the playback operation, reproduced signals by the rotary head pair 61 and 62 are amplified by the playback amplifier 63 and are separated into two signals corresponding to the carrier frequencies of the frequency modulated signal by the band pass filters (BPFs) 64 and 65. The two separated signals are respectively demodulated and the audio signals of the L and R channels are provided to the terminals 68 and 69.

As mentioned above, since the two kinds of audio signals can be also recorded and reproduced in correspondence to the video signals, the video signals accompanied with the audio signals of two channels can be simultaneously recorded and reproduced.

As will be obviously understood from the above description, according to the invention, signals of a plurality of channels can be simultaneously recorded. The signals may be reproduced by VTR of the prior art which can record the video and audio signals of one channel only. Therefore, since the video tape recorder may record, the video and audio signals obtained from a BS tuner to the first channel, and the video and audio signals derived from the VHF tuner to the second channel, the video tape recorder records and reproduces simultaneously even plural programs whose broadcasting time zones overlap each other, so that the reproduced signals can be selected and the corresponding program can be played later. Thus, a loss of opportunity to watch the programs is prevented.

I claim:

1. A recording and reproducing apparatus for recording and reproducing a plurality of video signals, having respective independent vertical sync signals, onto and from a video tape running relative to a rotary cylinder by rotary head pairs mounted on the rotary cylinder, said plurality of video signals being from different channels, the video tape having a control track and a recording track and tracks with a predetermined recording track pitch, the apparatus comprising:

(A) a recording means, for simultaneously recording said plurality of video signals, including:
recording processing means for converting said video signals into recordable signals, said video signals having different independent video information from one another;
a first pair of rotary heads, each head having a track width narrower than said recording track pitch, a first one of said first pair of rotary heads having a first gap azimuth angle and a second one of said first pair of rotary heads having a second gap azimuth angle having a reverse direction to said first gap azimuth angle and said first one of said first pair of rotary heads and said second one of said first pair of rotary heads being located at opposite positions on the cylinder with respect to each other, said first pair of rotary heads recording a first one of the recordable signals onto the video tape and reading out the same signal from the video tape;

a second pair of rotary heads, each head having a track width narrower than said recording track pitch, a first one of said second pair of rotary heads having said first gap azimuth angle and a second one of said second pair of rotary heads having said second gap azimuth angle, said first one of said second pair of rotary heads and said second one of said second pair of rotary heads being located at opposite positions on the cylinder with respect to each other, at positions other than the positions of said first pair of rotary heads, said second pair of rotary heads recording a second one of the recordable signals onto the video tape and reading out the same signal from the video tape, a height of said positions of said rotary heads being set so that tracks recorded by said second pair of rotary heads are arranged between tracks recorded by said first pair of rotary heads, so as to provide a gap between recorded tracks having the same azimuth angle; and means for generating a control signal synchronously with the vertical sync signal included in either one of the video signals corresponding to the first one of the recordable signals and the second one of the recordable signals recorded by said first pair and second pair of rotary heads, and for recording said control signal to the control track, and (B) a playback system used with said first and second pairs of rotary heads, the playback system including:

playback processing means for reconstructing signals read out and reproduced through one of said first and second pairs of the rotary heads into video signals; and servo means for reproducing the control signal and for controlling operation of the rotary heads and running of the video tape in accordance with the reproduced control signal.

2. An apparatus according to claim 1, wherein the servo means controls the video tape to run in a standard mode, the first pair of the rotary heads is a long time mode type head and the second pair of the rotary heads comprises rotary heads having azimuth angles corresponding to the azimuth angles of said first pair of the rotary heads.

3. An apparatus according to claim 1, the apparatus having a standard recording mode and a long time recording mode to record a single video signal in addition to a mode to simultaneously record the plurality of video signals, and either one of said modes is selectable upon recording.

4. An apparatus according to claim 1, wherein said video tape is accommodated with a linear audio track, the apparatus further comprising a first audio signal recording means for recording an audio signal onto the linear audio track of the video tape corresponding to the first one of the recordable video signals, and a second audio signal recording means including rotary heads for recording frequency modulated audio signals in accordance with the second one of the recordable video signals in the mode to simultaneously record the plurality of video signals.

5. An apparatus according to claim 1, wherein the playback processing means comprises a selecting circuit for selecting and switching one of the reproduced signals derived from the first and second pair of the rotary heads and a reproduction circuit for regenerating a video signal from the selected reproduced signal.

6. An apparatus according to claim 1, wherein the apparatus further comprises a plurality of playback processing means for regenerating a plurality of video signals from the reproduced signals derived from the first and second pair of the rotary heads.

7. A recording and reproducing apparatus for recording and reproducing a plurality of video signals, having respective independent vertical sync signals onto and from a video tape running relative to a rotary cylinder by rotary head pairs mounted on the rotary cylinder, said plurality of video signals being from different channels, the video tape having a control track and a recording track and tracks with a predetermined recording track pitch, the apparatus comprising:

(A) a recording means, for simultaneously recording said plurality of video signals, including:

synchronization processing means for controlling phases of the respective vertical sync signals of said video signals so as to be synchronized with each other;

recording processing means for converting said video signals into recordable signals;

a first pair of rotary heads, each head having a track width narrower than said recording track pitch, a first one of said first pair of rotary heads having a first gap azimuth angle and a second one of said first pair of rotary heads having a second gap azimuth angle having a reverse direction to said first gap azimuth angle and said first one of said first pair of rotary heads and said second of said first pair of rotary heads being located at opposite positions on the cylinder with respect to each other, said first pair of rotary heads recording a first one of the recordable signals onto the video tape and reading out the same signal from the video tape;

a second pair of rotary heads, each head having a track width narrower than said recording track pitch, a first one of said second pair of rotary heads having said first gap azimuth angle and a second one of said second pair of rotary heads having said second gap azimuth angle, said first one of said second pair of rotary heads and said second one of said second pair of rotary heads being located at opposite positions on the cylinder with respect to each other, at positions other than the positions of said first pair of rotary heads, said second pair of rotary heads recording a second one of the recordable signals onto the video tape and reading out the same signal from the video tape, a height of said positions of said rotary heads being set so that tracks recorded by said second pair of rotary heads are arranged between tracks recorded by said first pair of rotary heads, so as to provide a gap between recorded tracks having the same azimuth angle; and means for generating a control signal synchronously with the vertical sync signal included in either one of the video signals corresponding to the first one of the recordable signals and the second one of the recordable signals recorded by said first pair and second pair of rotary heads, and for recording said control signal to the control track, and (B) a playback system used with said first and second pairs of rotary heads, the playback system including:

playback processing means for reconstructing signals read out and reproduced through one of said first and second pairs of the rotary heads into video signals; and servo means for reproducing the control signal and for controlling operation of the rotary heads and running of the video tape in accordance with the reproduced control signal.

8. An apparatus according to claim 7, wherein the servo means controls the video tape to run in a standard mode, the first pair of the rotary heads is a long time mode type head and the second pair of the rotary heads comprises rotary heads having azimuth angles corresponding to the azimuth angles of said first pair of the rotary heads.

9. An apparatus according to claim 7, the apparatus having a standard recording mode and a long time recording mode to record a single video signal in addition to a mode to simultaneously record the plurality of video signals, and either one of said modes is selectable upon recording.

10. An apparatus according to claim 7, wherein said video tape is accommodated with a linear audio track, the apparatus further comprising a first audio signal recording means for recording an audio signal onto the linear audio track of the video tape corresponding to the first one of the recordable video signals, and a second audio signal recording means including rotary heads for recording frequency modulated audio signals in accordance with the second one of the recordable video signals in the mode to simultaneously record the plurality of video signals.

11. An apparatus according to claim 7, wherein the playback processing means comprises a selecting circuit for selecting and switching one of the reproduced signals derived from the first and second pair of the rotary heads and a reproduction circuit for regenerating a video signal from the selected reproduced signal.

12. An apparatus according to claim 7, wherein the apparatus further comprises a plurality of playback processing means for regenerating a plurality of video signals from the reproduced signals derived from the first and second pair of the rotary heads.

13. An apparatus according to claim 7, wherein said synchronization processing means delays the vertical sync signal of the second one of the video signals by a predetermined period so as to synchronize said vertical sync signal of said second one of said video signals with the vertical sync signal of the first one of the video signals.

* * * * *